Jan. 24, 1956   A. H. YOUNG   2,732,312
METHOD OF MAKING A COATED TRANSPARENT FLUORESCENT SCREEN
Filed Aug. 25, 1951

Inventor:
Andrew H. Young,
by Paul A. Frank
His Attorney.

United States Patent Office 2,732,312
Patented Jan. 24, 1956

2,732,312

METHOD OF MAKING A COATED TRANSPARENT FLUORESCENT SCREEN

Andrew H. Young, Schenectady, N. Y., assignor to General Electric Company, a corporation of New York Application August 25, 1951, Serial No. 243,687

4 Claims. (Cl. 117—33.5)

The present invention relates to cathode ray tubes, such for example, as the tubes used in television receiving apparatus. It is the object of my invention to provide simplified methods for fabricating fluorescent screens and relates in particular to image-forming screens which are responsive to cathode rays excitation and are substantially transparent to ordinary light.

It has been found to be advantageous to provide transparent luminescent screens for television receivers in order to reduce to a minimum light-scattering effects and halation which would unfavorably affect the clarity of images. Transparent luminescent screens were devised by D. A. Cusano and F. J. Studer and are described in their application for Letters Patent Serial No. 200,908, filed December 15, 1950 (assigned to the same assignee as the present application) and now Patent No. 2,675,331. These screens comprise transparent films of sulfide of zinc, or of cadmium, or of mixtures of such sulfides, together with a suitable activator. Such films are formed on a transparent base by deposition from reacting vapor components, the screen base being heated during deposition to an elevated temperature approximating 600° C.

For some fields of application the provision of a more simple method of film production is desirable, but the deposits of film materials produced by other methods heretofore have not proved to be useful as luminescent screens. For example, vaporization of zinc sulfide, or other chosen sulfide, accompanied by condensation of the vapor on a glass base, results in clear films but such films are not luminescent in response to cathode ray bombardment.

In accordance with my present invention, I have provided a new method of fabricating transparent luminescent screens whereby rugged adherent luminescent films of chosen composition are produced. This new method comprises the deposition on a desired support of films which consist either of a halogen compound of the chosen metal or of a film-forming metal in an uncombined state followed by the conversion of such films to a corresponding sulfide.

Figure 1:
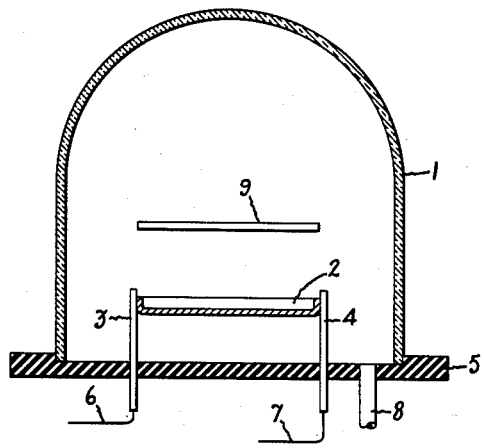
Figure 2:
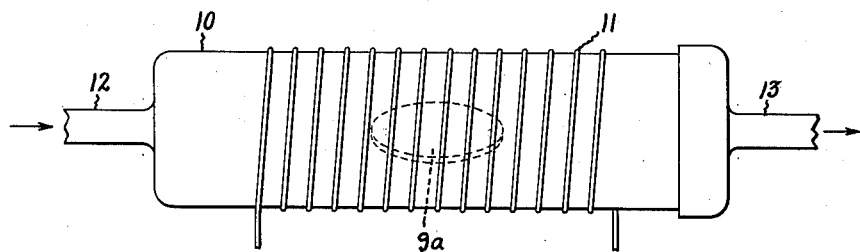

In the accompanying drawing, Fig. 1 is a vertical section of an apparatus for forming a chosen film of metal halide or uncombined metal and Fig. 2 shows an apparatus for converting such film to the desired sulfur compound.

The material to be deposited and converted to sulfide is volatilized in a vacuum in an apparatus such, for example, as shown in Fig. 1. The apparatus shown comprises a dome-shaped envelope 1, conveniently consisting of glass which is provided with a boat-shaped evaporator 2. The evaporator is supported and supplied with heating current in any suitable manner. Fig. 1 shows conventional terminals 3, 4, sealed hermetically into an insulating base 5, and connected to conductors 6, 7 whereby heating energy is supplied. A conduit 8 passing through the base 5 provides means for evacuating the envelope 1. Above the evaporator 2 is supported the base 9 which is to be coated with luminescent film. The base may consist of glass, or fused quartz, or other suitable transparent material. The means for supporting the transparent base has not been shown on the drawing in order to render the drawing as simple as possible.

*Example 1*

In carrying out my invention a suitable film-forming vaporizable compound, such, for example, as zinc fluoride, activated with manganese, may be volatilized from an evaporator boat 2, the vapor being condensed as a film on the glass base 9. The deposited film should be restricted in thickness within the limits of transparency. A film about .25 micron in thickness is transparent. Although such a film is fluorescent under cathode ray bombardment it is also undesirably phosphorescent and is not sufficiently rugged for cathode ray tube manufacture. For example, it is subject to being damaged (or "burned") by cathode ray bombardment. The film at this stage is not resistant to hot water. The next step in the present process consists in converting the film thus initially produced to a sulfide film.

The glass base after being coated with a film of zinc fluoride (and therefore designated as 9a) is transferred to a tubular reaction oven 10 which is adapted to be heated to an elevated temperature by heating means conventionally represented by the heater winding 11. Hydrogen sulfide or other chosen reaction gas may be admitted by a conduit 12 and carried away together with reaction by-products by a conduit 13. By means of the external heater, the envelope and the interior of the oven may be heated. Thus the coated glass base 9a may be heated to a temperature approximating 500° C. in an atmosphere of hydrogen sulfide, causing the fluoride to be converted to a sulfide. The resulting zinc sulfide film is rugged and is completely adherent while still being substantially transparent. It may be washed with hot water without apparent damage. Under cathode ray bombardment at 5 kv. the sulfide film fluoresces yellow without phosphorescence. It is not burned or damaged by cathode ray bombardment.

*Example 2*

An uncombined metal component of a desired sulfide film may be volatilized together with an activator in a modified process. The following example is not to be taken as restrictive but rather as showing variants still coming within the confines of my invention.

In order to prepare a film of the mixed sulfides of zinc and cadmium with an activator of copper, these metals first were fused in proportions roughly approximating the ultimate desired proportions. For example, a suitable mixture consists of about 85% zinc, 0.1% copper, the remainder being cadmium. Conveniently, the fusion occurs in hydrogen to protect from oxidation of the metals being fused.

A desired quantity of the resulting metal composition is put into the evaporator 2, and the interior of the envelope is evacuated through the conduit 8. Thereupon a sufficient amount of the metal is volatilized to produce a film of desired thickness without being so thick as to be opaque.

The glass base having thereon the deposited film is introduced into the reaction chamber 10, hydrogen sulfide gas is admitted through the conduit 12 and the envelope is heated to an elevated temperature. When the interior, including the base, has become heated to about 500° C., reaction occurs between the metal film and hydrogen sulfide. The heating is continued for about ten minutes. The metal film is converted to a sulfide film which is substantially transparent. When bombarded with cathode rays the sulfide film is fluorescent with a yellow-orange color.

What I claim as new and desire to secure by Letters Patent of the United States is:

1. The method of making a fluorescent screen which consists in depositing a transparent film on a base support in a vacuum by condensing volatilized material selected from the class consisting of zinc, cadmium, zinc halide, cadmium halide, and mixtures thereof, and heating the resulting film to a temperature of approximately 500° C. and bringing hydrogen sulfide gas into contact therewith to convert the same to a sulfur compound.

2. The method of making a fluorescent screen of metal sulfide which consists in depositing a film on a transparent base in a vacuum by condensing volatilized material chosen from the group consisting of zinc, cadmium, zinc halide, cadmium halide, and mixtures thereof, heating said film-coated base to a temperature of approximately 500° C. and bringing hydrogen sulfide into contact therewith.

3. The method of making a fluorescent screen which consists in depositing by condensation from vapor at reduced pressure on a transparent base a film of zinc fluoride having thickness within the limits of transparency, heating said film-coated base to a temperature of approximately 500° C. and at said temperature bringing said film into contact with hydrogen sulfide gas for a sufficient length of time to convert said fluoride to a sulfide, whereby a transparent film is formed which fluoresces when energized by cathode rays.

4. The method of making a fluorescent screen which consists in condensing from vapor on a transparent glass base a transparent film of uncombined zinc and an activator of fluorescence, heating said base and film to approximately 500° C. and while heated bringing hydrogen sulfide into contact therewith to convert said zinc film to a zinc sulfide film being transparent and fluorescent by cathode ray bombardment.

References Cited in the file of this patent

UNITED STATES PATENTS

| | | |
|---|---|---|
| 2,161,458 | De Boer et al. | June 6, 1939 |
| 2,280,939 | Weinhart | Apr. 28, 1942 |
| 2,462,517 | Leverenz | Feb. 22, 1949 |
| 2,542,122 | Ellefson | Feb. 20, 1951 |